Sept. 16, 1958 R. J. McCURDY 2,852,717
DEFLECTION CIRCUITS
Filed May 17, 1954
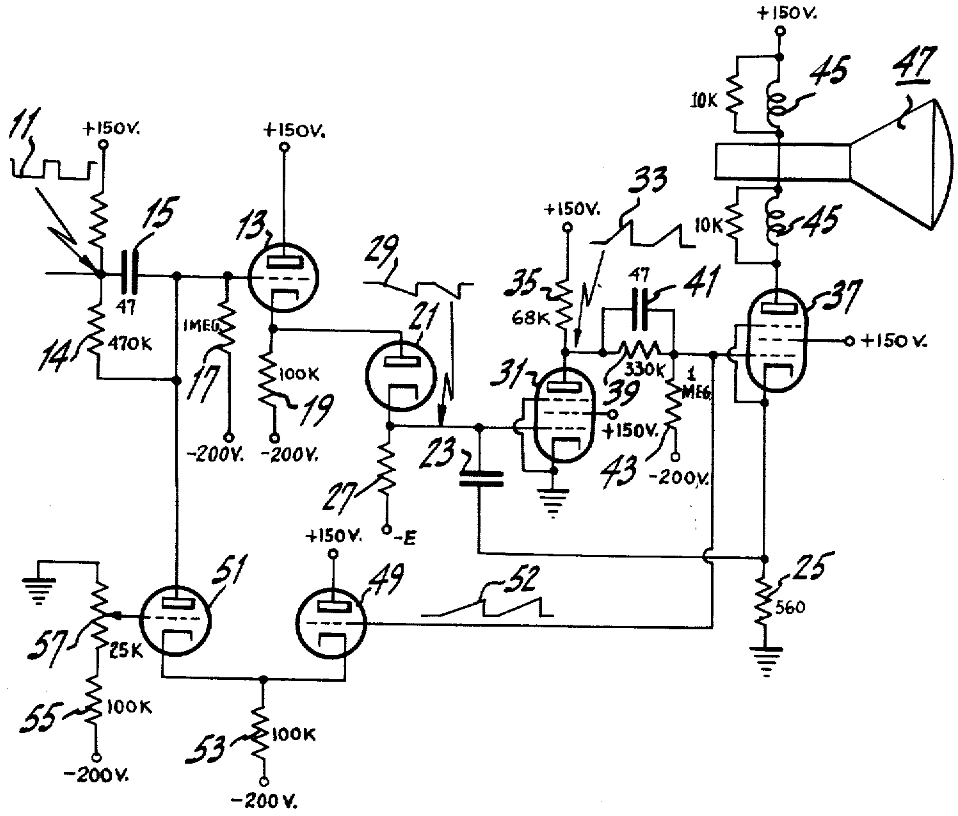
INVENTOR.
ROBERT J. McCURDY
BY
[signature]
ATTORNEY United States Patent Office 2,852,717

Patented Sept. 16, 1958

2,852,717

DEFLECTION CIRCUITS

Robert J. McCurdy, Haddonfield, N. J., assignor, by mesne assignments, to the United States of America as represented by the Secretary of the Navy Application May 17, 1954, Serial No. 430,063

10 Claims. (Cl. 315—27)

This invention relates to circuits for deflecting an electron beam in the cathode ray tube of a television or radar system or the like.

In present television and radar systems, an image is formed by an electron beam which is deflected to trace successive lines across a fluorescent screen in a cathode ray tube. Deflection of the electron beam is accomplished electromagnetically by applying a sawtooth wave of current to the windings of a deflection yoke mounted about the neck of the cathode ray tube. The sawtooth waveform causes the yoke current to increase at a uniform rate and then to return abruptly to its initial value to commence the succeeding wave. Accordingly the electron beam traces a line across the fluorescent screen of the cathode ray tube at a uniform rate and then snaps back abruptly to commence the succeeding trace at a starting or zero point. To minimize distortion in images reproduced by the deflected beam, it is essential that the sawtooth waveform have a high degree of linearity.

In practice, sawtooth waves of voltage are generated across a capacitor which is charged slowly by a direct voltage applied to the capacitor through a resistive network. The capacitor is then abruptly discharged by an electron tube that is rendered conductive during a brief interval. The sawtooth wave of voltage is impressed upon the grid of a power amplifying tube and a sawtooth wave of current is thereby obtained and applied to the windings of the deflection yoke.

It is an object of this invention to provide an improved circuit for developing sawtooth waves of current having a high degree of linearity.

It is a further object of this invention to provide magnetic deflection of an electron beam having a good linearity, fast retrace, and a good zero point stability.

According to this invention, a deflection circuit is provided with two independent degenerative feedback paths which operate alternately during the sweep time and during the retrace time respectively. The first feedback path, operative during the sweep interval, insures that the sawtooth waves have a linearly increasing current. The second feedback path, operative during the retrace interval, holds the grid of the power amplifier output tube at a point slightly below cutoff, such that the recovery time following retrace will be rapid and precise.

Other objects of this invention will become apparent upon a reading of the following specification and inspection of the accompanying drawing which is a circuit diagram of a sawtooth deflection wave generating circuit employing the teachings of this invention.

Referring to the drawing in more detail, there is seen a deflection circuit wherein negative gating pulses 11 from a multivibrator circuit or the like, are impressed upon the grid of a cathode follower tube 13 through a direct current coupling including a resistor 14 and a coupling capacitor 15. A grid leak resistor 17 provides proper grid bias to the cathode follower tube 13. A load resistor 19 is connected between the cathode of this tube and a negative 200 volt source.

A diode 21 is coupled to the cathode follower 13 and remains cut off during the time interval in which the negative gate pulse 11 is applied to the cathode follower 13. This allows a capacitor 23 to charge gradually through a resistive path including a resistor 25 and the cathode resistor 27 of the diode 21. Following the interval of the negative gating pulse 11, the grid of the cathode follower 13 goes positive, the cathode follower 13 conducts, and potential drop across the load resistor 19 biases the anode of the diode 21 positively, permitting the diode 21 to conduct. The conduction of the diode 21 abruptly discharges the capacitor 23. A sawtooth wave 29 generated by the gradual charge and the abrupt discharge of the capacitor 23 is applied to the control grid of an amplifying tube 31. The amplified sawtooth wave 33 appearing across the load resistor 35 is inverted from the input sawtooth 29 by the amplifying tube 31.

A power amplifier tube 37 is coupled for direct current flow to the previous amplifier tube 31 by a resistor 39. A capacitor 41 by-passes the high frequencies past the resistor 39. The control grid of the power amplifying tube 37 is biased by a grid leak resistor 43. The windings of a deflection yoke 45 are directly connected to the anode output of the power amplifier tube 37.

The deflection windings 45 are indicated to be mounted about the neck of a cathode ray tube 47 thereby providing magnetic deflection of the electron beam. These deflection windings may be rotatably mounted for providing a radar display.

The cathode of the power amplifier tube 37 is biased by the resistor 25 which is in the charge-discharge circuit of the discharge capacitor 23 thereby providing a first degenerative feedback path from the output current of the power amplifying tube 37 to the sawtooth deflection wave generating circuit. This degenerative feedback linearizes the sawtooth wave during its sweep time when the power amplifying tube 37 is conducting. During the retrace interval the grid of the power amplifier tube 37 is driven negatively, cutting off this tube and rendering the first feedback path inoperative.

A second degenerative feedback path including a cathode follower tube 49 and a grounded grid amplifying tube 51 becomes operative during the retrace interval. The feedback signal of sawtooth waveform 52 is impressed upon the grid of the cathode follower 49, and appears across the load resistor 53. The feedback signal 52 is thence impressed upon the cathode of the grounded grid amplifier 51. The voltage of the grid of tube 51 is controlled by the potential dividing resistive network including a resistor 55 and a potentiometer 57. The anode of the grounded grid amplifier 51 is directly connected to the gating pulse input circuit, and this tube 51 is cut off during the intervals of the negative pulses 11. Therefore this second feedback path is operative only during the intervals between the negative gating pulses 11 which correspond to the intervals of retrace of the electron beam.

To better understand the operation of the second feedback path, we may assume that during the retrace interval the grid bias of the power amplifying tube 37 becomes excessively negative. This negative signal will be coupled through the cathode follower tube 49 to the grounded grid amplifier tube 51. An amplified error signal is coupled back to the input of the cathode follower 13 and is then conveyed through the diode 21 and the amplifying tube 31 back to the grid of the power amplifier 37. Thus, the grid voltage of the power amplifier 37 is stabilized.

This second degenerative feedback path, formed by the cathode follower 49 and the grounded grid amplifier 51, functions to maintain the grid of the power amplifier tube 37 at a voltage slightly below cutoff during the retrace intervals. Therefore the cutoff bias voltage of this tube 37 cannot become excessive and no delay will be incurred at the start of the succeeding sweep of the electron beam. Fast recovery from retrace to sweep is thereby insured and this results in accurate zero stability at the beginning of the beam scan.

Having thus described the invention, what is claimed is:

1. A system for deflecting an electron beam in a cathode ray tube, said system comprising an input circuit for receiving pulses, a deflection wave generating circuit coupled to said input circuit, an amplifying circuit coupled to said deflection wave generating circuit, a deflection yoke winding coupled to said amplifying circuit, a first degenerative feedback path coupled between said amplifying circuit and said deflection wave generating circuit, a second degenerative feedback path coupled between said amplifying circuit and said input circuit, said first feedback path being operative to linearize the waveform of the sawtooth deflection waves impressed upon said yoke winding, said second feedback path being operative to stabilize a zero point of the electron beam in said cathode ray tube.

2. A circuit for electromagnetically deflecting an electron beam to trace successive lines during sweep intervals and to return a zero point during retrace intervals, said circuit comprising a means for generating deflection waves of voltage, voltage amplification means coupled to said deflection wave generating means, power amplification means coupled to said voltage amplification means, a first degenerative feedback path coupled between said power amplification means and said voltage amplification means, said first degenerative feedback path being operative to linearize the deflection waves during the sweep intervals, a second degenerative feedback path coupled between said voltage amplification means and said deflection wave generating means, said second degenerative feed back path being operative to stabilize the power amplification means during the retrace intervals.

3. A circuit for deflecting an electron beam to trace successive lines during sweep intervals and to return to a zero point during retrace intervals, said circuit comprising a means for generating deflection waves, amplifying means coupled to said deflection wave generating means, a deflection yoke winding coupled to said amplifying means, said deflection yoke winding being operative to receive deflection current from said amplifying means, a first degenerative feedback path sampling said deflection current and coupled to said amplifying means for linearizing the deflection waves, a second degenerative feedback path coupled between said amplifying means and said deflection wave generating means, said second feedback path being operative during the retrace intervals to stabilize said amplifying means.

4. A circuit for electromagnetically deflecting an electron beam to trace successive lines during sweep intervals and to return to a zero point during retrace intervals, said circuit comprising a means for generating deflection waves of voltage, voltage amplification means coupled to said deflection wave generating means, power amplification means coupled to said voltage amplification means, said power amplification means being operative to produce deflection waves of current for a deflection yoke winding, said power amplification means including an electron tube having at least a cathode and a control electrode, a degenerative first feedback path coupled between the cathode of said electron tube and said voltage amplification means, said first feedback path being operative during the sweep intervals to linearize the deflection waves, a degenerative second feedback path coupled between the control electrode of said electron tube and said deflection wave generating means, said second feedback path being operative during retrace intervals to stabilize the voltage of the control electrode of said electron tube.

5. A circuit for electromagnetically deflecting an electron beam, said circuit comprising a means for generating sawtooth deflection waves coupled to a deflection yoke winding by amplifying means, said deflection wave generating means including a discharge capacitor coupled to a source of voltage through a resistive network, said amplifying means including an electron tube having at least a cathode and an anode, the anode of said electron tube being connected to said deflection yoke winding and providing deflection waves of current thereto, a cathode biasing resistor connected to the cathode of said electron tube, said cathode biasing resistor being further connected into the resistive network coupling said discharge capacitor to said source of voltage thereby providing a degenerative feedback path for linearizing the deflection waves of current flowing from the anode of said electron tube to said deflection yoke winding.

6. A circuit for electromagnetically deflecting an electron beam, said circuit comprising input means for receiving voltage pulses, means for generating sawtooth deflection waves coupled to said input means, amplifying means coupled to said deflection wave generating means, a deflection yoke winding coupled to said amplifying means, said deflection wave generating means including a discharge capacitor coupled to a source of voltage through a resistive network, said amplifying means including an electron tube having at least a cathode, a control electrode and an anode, the anode of said electron tube being coupled to said deflection yoke windings and providing deflection waves of current thereto, a cathode biasing resistor connected to the cathode of said electron tube, said cathode biasing resistor being further connected into the resistive network coupling said discharge capacitor to said source of voltage thereby providing a first degenerative feedback path for linearizing the deflection waves of current flowing from the anode of said electron tube to said deflection yoke windings, a second feedback path coupled between the control electrode of said electron tube and said input means, said second feedback being operative to stabilize the voltage of the control electrode of said electron tube during intervals between said voltage pulses.

7. In a circuit arrangement for developing an output wave in response to a train of negative going pulses, an input lead to which said pulses are applied, an electron discharge tube having an electrode coupled to said input lead, an anode connected to a load element, and a cathode connected to a point of fixed reference potential, a cathode follower tube having a grid connected to said electrode of said electron discharge tube and a cathode, an amplifier tube having a cathode connected to the cathode of said cathode follower tube, an anode connected to said input lead and a grid connected to a point of fixed potential, thereby to maintain said electrode of said electron discharge tube at a fixed voltage between said negative going pulses.

8. In a circuit arrangement for translating a sawtooth wave in response to a train of negative going pulses, an input lead to which said pulses are applied, a sawtooth wave generating circuit comprising a resistor, a capacitor and a second resistor connected in series across a source of direct potential, an output tube having a grid connected to the junction between said resistor and said capacitor, an anode connected to a load element at which said sawtooth wave is presented and a cathode connected to the junction between said capacitor and said second resistor, a cathode follower tube having a grid connected to the grid of said output tube and a cathode, an amplifier tube having a cathode connected to the cathode of said cathode follower tube, an anode connected to said input lead and a grid connected to a point of fixed potential, thereby to maintain the grid of the said output tube at a fixed potential between said negative going pulses.

9. In a circuit arrangement for developing a sawtooth current wave in response to a train of negative going pulses, an input lead to which said pulses are applied, a diode having an anode electrode coupled to said input lead and a cathode electrode, a sawtooth generating circuit comprising a resistor, a capacitor and a second resistor connected in series across a source of direct potential, an output tube having a control grid connected to the cathode electrode of said diode and to the junction between said resistor and said capacitor, an anode connected to a load element through which said sawtooth current wave is passed and a cathode connected to the junction between said capacitor and said second resistor, a cathode follower tube having a grid connected to the grid of said output tube and a cathode, an amplifier tube having a cathode connected to the cathode of said cathode follower tube, an anode connected to said input lead and a grid connected to a point of adjustable potential.

10. In a circuit arrangement for developing a sawtooth current wave in response to a train of negative potential gating pulses, a cathode follower tube having a grid to which said pulses are applied and a cathode at which said pulses are repeated, a diode having an anode electrode coupled to the cathode of said cathode follower and a cathode electrode, a sawtooth wave generating circuit comprising a resistor, a capacitor and a second resistor connected in series across a source of direct potential, a driver tube having a control electrode connected to the cathode electrode of said diode and to the junction between said resistor and said capacitor and an anode, an output tube having a control grid connected to the anode of said driver tube, an anode connected to a load element through which a sawtooth current wave is passed and a cathode connected to the junction between said capacitor and said second resistor, another cathode follower tube having a grid connected to the grid of said output tube and a cathode, an amplifier tube having a cathode connected to the cathode of said other cathode follower tube, an anode connected to the grid of the first said cathode follower and a grid connected to a point of adjustable potential.

References Cited in the file of this patent

UNITED STATES PATENTS

| | | |
|---|---|---|
| 2,589,299 | Setchell | Mar. 18, 1952 |
| 2,655,615 | Seldin | Oct. 13, 1953 |
| 2,662,198 | Starks-Field | Dec. 8, 1953 |
| 2,664,521 | Schlesinger | Dec. 29, 1953 |
| 2,664,523 | Spradlin et al. | Dec. 29, 1953 |
| 2,713,651 | Coffey | July 19, 1955 |
| 2,729,766 | Vilkomerson | Jan. 3, 1956 |